(12) United States Patent
Kruglick (10) Patent No.: US 9,607,409 B2
(45) Date of Patent: Mar. 28, 2017

(54) SUPPRESSION OF REAL FEATURES IN SEE-THROUGH DISPLAY

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 1 day.

(21) Appl. No.: 14/373,829

(22) PCT Filed: Dec. 23, 2013

(86) PCT No.: PCT/US2013/077598
§ 371 (c)(1),
(2) Date: Jul. 22, 2014

(87) PCT Pub. No.: WO2015/099683
PCT Pub. Date: Jul. 2, 2015

(65) Prior Publication Data
US 2015/0178967 A1 Jun. 25, 2015

(51) Int. Cl.
*G06T 11/00* (2006.01)
*G09G 5/00* (2006.01)

(52) U.S. Cl.
CPC .......... *G06T 11/00* (2013.01); *G06T 2210/22* (2013.01)

(58) Field of Classification Search
CPC ....... G06T 5/001; G06T 5/004; G06T 19/006; G06T 2207/20032; G06F 3/011;
(Continued)

(56) References Cited

U.S. PATENT DOCUMENTS 6,590,574 B1 * 7/2003 Andrews ............... G06T 15/503
345/419
8,203,502 B1 * 6/2012 Chi ....................... G02B 27/017
345/7
(Continued)

FOREIGN PATENT DOCUMENTS

EP 2600616 A2 6/2013
WO 2013067230 A1 5/2013
WO 2013090474 A1 6/2013

OTHER PUBLICATIONS

Chen, Jiazhou, et al. "On-line visualization of underground structures using context features." Proceedings of the 17th ACM Symposium on Virtual Reality Software and Technology. ACM, 2010.*
(Continued)

*Primary Examiner* — Ulka Chauhan
*Assistant Examiner* — Sae Won Yoon
(74) *Attorney, Agent, or Firm* — Moritt Hock & Hamroff LLP; Steven S. Rubin, Esq.

(57) ABSTRACT

Technologies are described for display of a merged image on a display. A processor may receive first data that relates to a first image of a real object and second data that relates to a second image of a virtual object. The second image, if displayed, may overlap, in an overlap region, at least part of the first image if the first image were displayed. The processor may identify an overlap part in the first data that corresponds to the overlap region, clip the overlap part from the first data to produce clipped data, and blur the clipped data to produce blurred data. The processor may subtract the clipped data from the blurred data to produce an additive blur component, add the additive blur component to the second data to produce merged data, and generate the merged image to be displayed on the display based on the merged data.

15 Claims, 6 Drawing Sheets

(58) Field of Classification Search
CPC ......... G06F 3/012; G06F 3/013; G02B 27/01; G02B 27/017; H04N 1/4092; H04N 21/4318
USPC .................................. 345/625; 382/262, 264
See application file for complete search history.

(56) References Cited

U.S. PATENT DOCUMENTS

| | | | |
|---|---|---|---|
| 8,810,599 B1* | 8/2014 | Tseng | G06T 7/0018 340/435 |
| 2003/0235343 A1* | 12/2003 | Kagaya | G06T 5/10 382/274 |
| 2005/0007462 A1* | 1/2005 | Koizumi | H04N 1/32128 348/222.1 |
| 2005/0225781 A1* | 10/2005 | Koizumi | H04N 1/4092 358/1.9 |
| 2007/0009145 A1* | 1/2007 | Winsor | A61B 6/583 382/132 |
| 2008/0063241 A1* | 3/2008 | Moriya | G06K 9/036 382/112 |
| 2008/0267533 A1* | 10/2008 | Ida | G06T 3/403 382/299 |
| 2009/0027337 A1 | 1/2009 | Hildreth | |
| 2009/0027732 A1* | 1/2009 | Imai | G06T 5/00 358/3.27 |
| 2009/0196524 A1* | 8/2009 | Godin | G06T 5/004 382/263 |
| 2010/0289817 A1 | 11/2010 | Meier et al. | |
| 2010/0329581 A1* | 12/2010 | Yamazaki | G06T 5/004 382/254 |
| 2012/0027290 A1* | 2/2012 | Baheti | G06K 9/6857 382/154 |
| 2012/0326948 A1 | 12/2012 | Crocco et al. | |
| 2013/0063486 A1 | 3/2013 | Braun et al. | |
| 2013/0093788 A1 | 4/2013 | Liu et al. | |
| 2013/0156091 A1* | 6/2013 | Li | H04N 19/115 375/240.01 |
| 2013/0194259 A1* | 8/2013 | Bennett | G06T 19/006 345/420 |
| 2014/0022281 A1* | 1/2014 | Georgeson | B64F 5/0045 345/633 |
| 2014/0125558 A1* | 5/2014 | Miyajima | G06F 17/289 345/8 |

OTHER PUBLICATIONS

"Additive color," accessed at: http://web.archive.org/web/20131216161032/http://en.wikipedia.org/wiki/Additive_color, Accessed on Jul. 11, 2014, pp. 7.

Bier, E. A. et al., "Toolglass and Magic Lenses: The See-through Interface," In Proceedings of the 20th Annual Conference on Computer Graphics and Interactive Techniques, 1993, pp. 73-80.

Gabbard, J. L. et al., "An Empirical User-based Study of Text Drawing Styles and Outdoor Background Textures for Augmented Reality," In Virtual Reality, 2005. Proceedings. VR 2005. IEEE, Mar. 12-16, 2005, pp. 11-18.

International Search Report and written opinion for PCT Application No. PCT/US2013/77598 filed on Dec. 23, 2013, 10 pages.

Lipson, H., et al., "Online Product Maintenance by Web-Based Augmented Reality," University of Tokyo, 2001, pp. 12.

Mukawa, H., et al., "8.4: Distinguished Paper: a Full Color Eyewear Display Using Holographic Planar Waveguides," SID Symposium Digest of Technical Papers, vol. 39, No. 1, May 2008, pp. 89-92.

Rosen, M. et al., "Color Management Within a Spectral Image Visualization Tool," Rochester Institute of Technology Rochester, New York, 2000, pp. 75-80.

* cited by examiner

SUPPRESSION OF REAL FEATURES IN SEE-THROUGH DISPLAY

CROSS-REFERENCE TO RELATED APPLICATION

This application is a U.S. National Stage filing under 35 U.S.C. §371 of International Application No. PCT/US13/77598 filed on Dec. 23, 2013, the entirety of which is hereby incorporated by reference.

BACKGROUND

Unless otherwise indicated herein, the materials described in this section are not prior art to the claims in this application and are not admitted to be prior art by inclusion in this section.

A see-through display may be a display that allows a viewer to see what is displayed on, or projected from, the see-through display while still allowing the viewer to see real objects through the see-through display. See-through displays can be used for augmented reality. See-through displays may enhance a viewer's view of the world with virtual images overlaid onto the real objects seen through the see-through display.

SUMMARY

According to some examples, methods for displaying a merged image on a display are generally described. The methods may include, by a processor, receiving first data. The first data may relate to a first image of a real object. The methods may include receiving second data. The second data may relate to a second image of a virtual object. The second image, if displayed on the display, may overlap, in an overlap region, at least part of the first image if the first image were displayed on the display. The methods may include identifying an overlap part in the first data that corresponds to the overlap region. The methods may include clipping the overlap part from the first data to produce clipped data. The methods may include blurring the clipped data to produce blurred data. The methods may include subtracting the clipped data from the blurred data to produce an additive blur component. The methods may include adding the additive blur component to the second data to produce merged data. The methods may also include generating the merged image to be displayed on the display based on the merged data.

According to other examples, augmented reality devices effective to display an image are generally described. The devices may include a memory that includes instructions. The devices may further include a camera configured to capture first data. The first data may relate to a first image of a real object. The devices may also include a processor configured to be in communication with the memory and camera. The processor may be configured to receive the first data. The processor may also be configured to receive second data. The second data may relate to a second image of a virtual object. The second image, if displayed on the display, may overlap, in an overlap region, at least part of the first image if the first image were displayed on the display. The processor may be configured to identify an overlap part in the first data that corresponds to the overlap region. The processor may be configured to clip the overlap part from the first data to produce clipped data. The processor may be configured to blur the clipped data to produce blurred data. The processor may be configured to subtract the clipped data from the blurred data to produce an additive blur component. The processor may be configured to add the additive blur component to the second data to produce merged data. The processor may be configured to generate the merged image. The devices may further include a display configured to be in communication with the processor. The display may be configured to display the merged image on the display.

According to further examples, methods for displaying a merged image on a display are generally described. The methods may include, by a camera, capturing first data. The first data may relate to a first image of a real object. The methods may further include, by a processor, receiving second data. The second data may relate to a second image of a virtual object. The second image, if displayed on the display, may overlap, in an overlap region, at least part of the first image if the first image were displayed on the display. The methods may include clipping the overlap part from the first data to produce clipped data. The methods may include blurring the clipped data to produce blurred data. The methods may include subtracting the clipped data from the blurred data to produce an additive blur component. The methods may include adding the additive blur component to the second data to produce merged data. The methods may further include generating the merged image to be displayed on the display based on the merged data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to technologies including methods, apparatus, systems, devices, and computer program products related to suppression of real features in a see-through display.

Briefly stated, technologies are generally described for display of a merged image on a display. According to some examples, a processor may receive first data that relates to a first image of a real object and second data that relates to a second image of a virtual object. The second image, if displayed, may overlap, in an overlap region, at least part of the first image if the first image were displayed. The processor may identify an overlap part in the first data that corresponds to the overlap region, clip the overlap part from the first data to produce clipped data, and blur the clipped data to produce blurred data. The processor may subtract the clipped data from the blurred data to produce an additive blur component, add the additive blur component to the second data to produce merged data, and generate the merged image to be displayed on the display based on the merged data.

Figure 1:
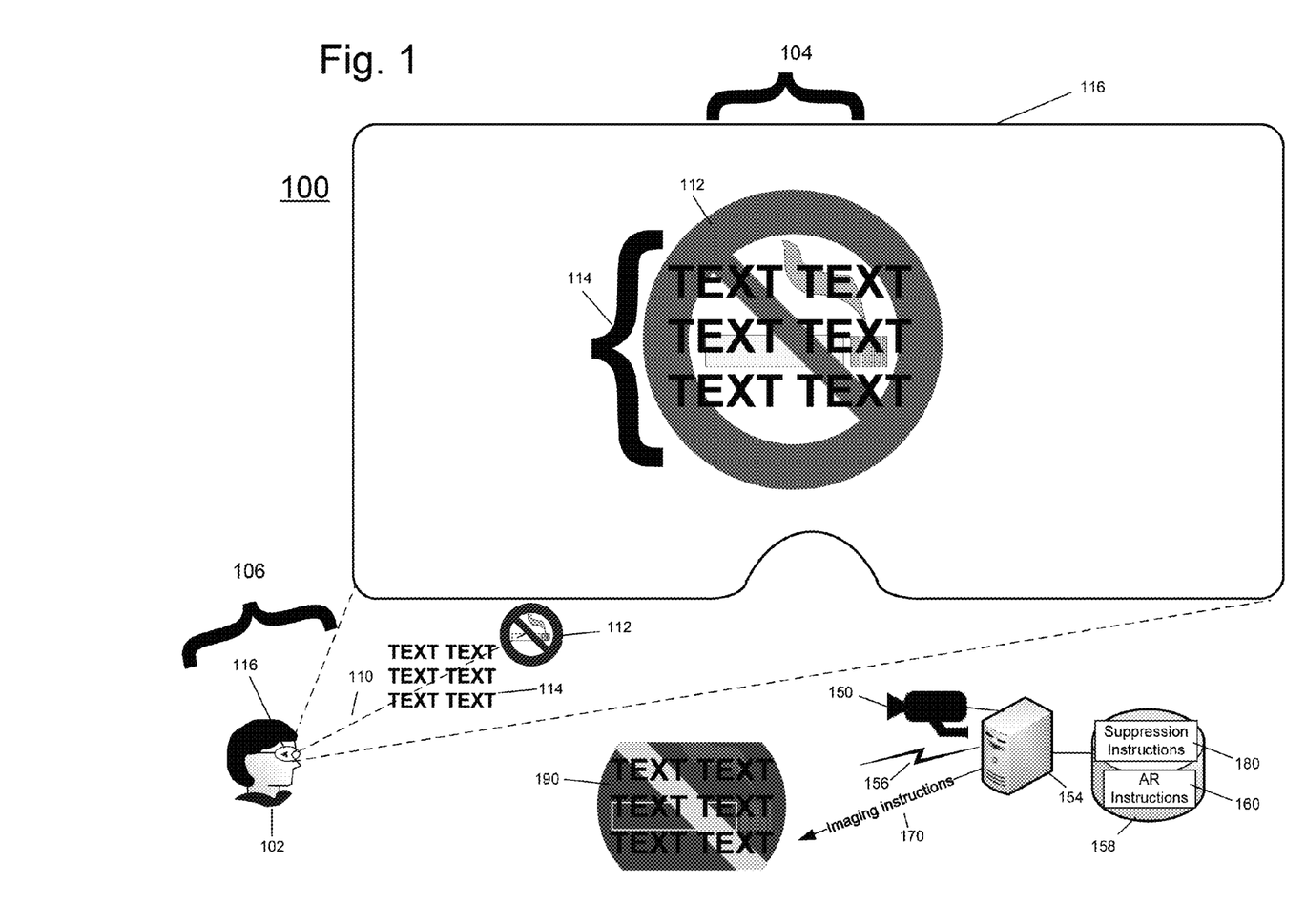
FIG. 1 illustrates an example system effective to suppress real features in a see-through display.

FIG. 1 illustrates an example system 100 effective to suppress real features in a see-through display, arranged in accordance with at least some embodiments presented herein. As depicted, FIG. 1 includes a front view 104 and a side perspective 106 of system 100. System 100 may include a see-through display (hereinafter sometimes just "display") 116. Display 116 may be arranged to be in communication with a processor 154 through a communication link 156. In some examples, processor 154 may be adapted to be in communication with a camera 150 and a memory 158. Memory 158 may include augmented reality ("AR") instructions 160 and suppression instructions 180 stored therein. Processor 154 may be configured, such as by AR instructions 160 and suppression instructions 180, to control at least some of the operations/actions/functions described below. In one example, display 116 may be a see-through glasses device, such as GOOGLE GLASS. Processor 154 may send imaging instructions 170 to instruct display 116 to display virtual image 114 of a virtual object. In the example, virtual image 114 is text and is shown literally with the words "TEXT". Processor 154 may be in the same housing as display 116.

Side perspective 106 depicts a viewer 102 wearing an AR glasses device (corresponding to an example of display 116) and viewing virtual image 114 displayed on display 116 along a line of sight 110. A real object 112 may appear behind virtual image 114 along line of sight 110.

Front view 104 depicts a composite view, including virtual image 114 of the virtual object ("TEXT") and real object 112 viewed by a viewer 102. Real object 112 may visually integrate with virtual image 114 changing the perception of virtual image 114 and/or obscuring details, features, or possibly all of virtual image 114. As explained in more detail below, processor 154 may generate imaging instructions 170 based on AR instructions 160 and based on suppression instructions 180. Imaging instructions 170 may be provided to display 116 and may include data used to produce a merged image 190 in place of virtual image 114. Display 116 may render imaging instructions 170 to display merged image 190. Merged image 190 may include virtual image 114 along with images that may suppress real features of real object 112. Merged image 190, when displayed on display 116, may suppress real features of real object 112 thereby inhibiting the real features of real object 112 from interfering with virtual image 114.

Figure 2:
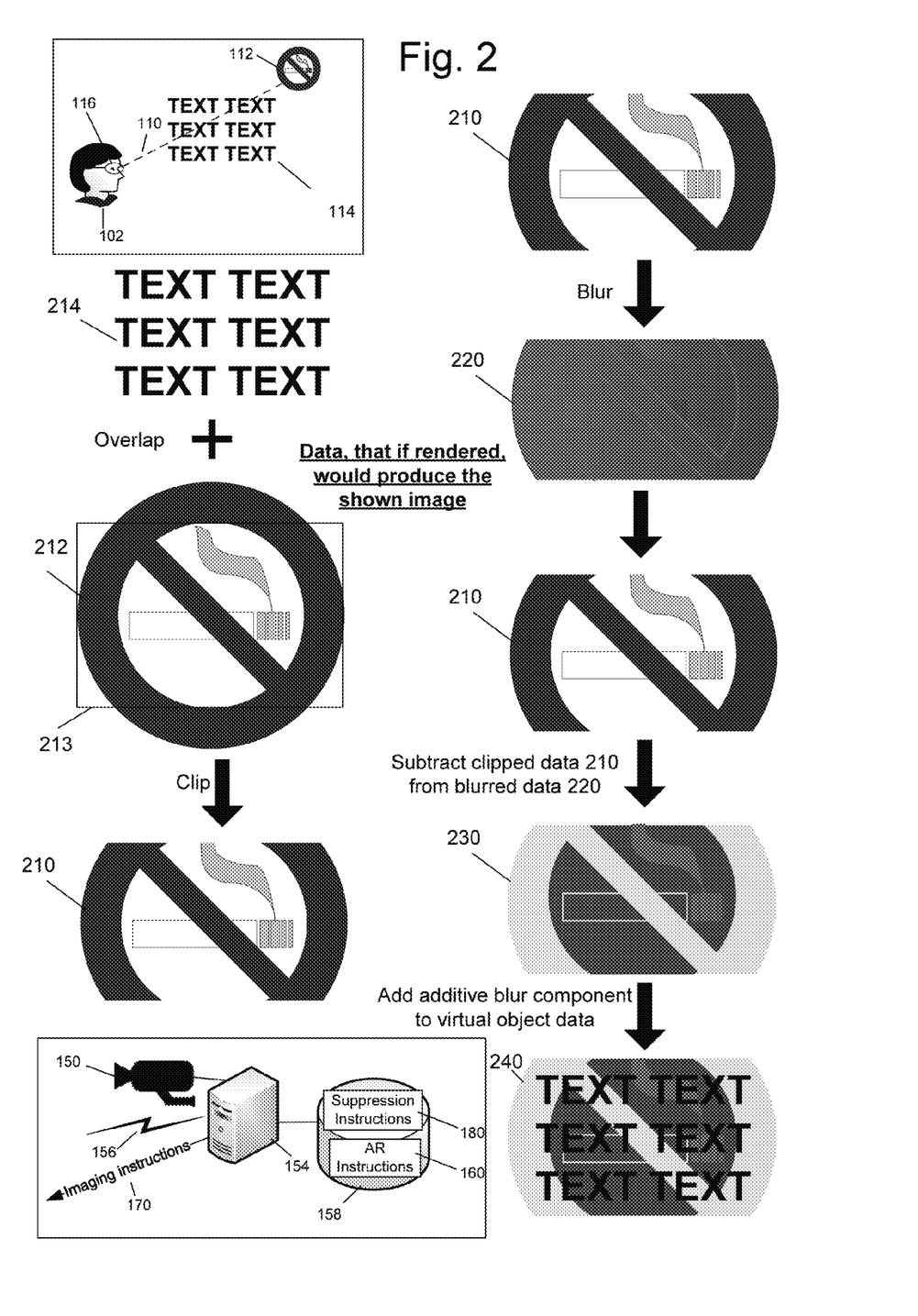
FIG. 2 illustrates an example process that can be utilized to create merged data that may be rendered on a see-through display to suppress real features.

FIG. 2 illustrates an example process that can be utilized to create merged data that may be rendered on a see-through display to suppress real features, arranged in accordance with at least some embodiments presented herein. Those components in FIG. 2 that are labeled identically to components of FIG. 1 will not be described again for the purposes of clarity.

Processor 154 may be configured to receive AR instructions 160 stored in memory 158. AR instructions may include virtual image data 214, related to virtual image 114, to be displayed on display 116. Processor 154 may also be configured to receive real object data 212, from camera 150, related to real object 112. Camera 150 may have the same resolution as display 116 or may have a higher or lower resolution than display 116.

To improve clarity of the discussion, in FIG. 2, references to data are accompanied by a representation in the figure of an image produced when the corresponding data is rendered on display 116. For example, virtual image data 214 is represented in FIG. 2 with the words "TEXT TEXT" indicating that when virtual image data 214 is rendered on display 116, the rendering may produce the image "TEXT TEXT".

In one example, camera 150 may capture real object data 212 using a subset, such as one quarter, of the pixels available to camera 150. Processor 154 may, by executing instructions from suppression instructions 180, register virtual image data 214, corresponding to virtual image 114, to real object data 212 corresponding to an image of real object 112. The registration may include aligning virtual image data 214 and real object data 212 so that virtual image 114 may be aligned with real object 112 along line of sight 110. Camera 150 may be calibrated by viewer 102 prior to registration such as by prompting viewer 102 to line up camera 150 with features of real object 112 with use of registration marks. Registration may relate or register features or locations in real object data 212 with locations in virtual image data 214.

Registration may include viewer 102 aligning features or four corners locations of virtual image data 214 with four locations in real object data 212. Registration may also be performed using features of real object 112. For example, processor 154 may find tracking features in real object data 212 related to real object 112 and instruct viewer 102 to align a point in virtual image 114 with a target feature in real object 112. In an example, a feature extraction and tracking mechanism may subject real object data 212 to a Sobel edge filter. A Sobel edge filter may be used to generate points on display 116 that move relative to viewed real object 112 and allow viewer 102 to indicate when a moving point overlays a stationary virtual point on display 116. In an example, four calibration points may be used for a perspective transformation.

Virtual image data 214, if rendered by processor 154, may produce virtual image 114 on display 116. Similarly, real object data 212, if rendered by processor 154, may produce an image of real object 112 on display 116. Virtual image 114, if displayed on display 116, may overlap an image of real object 112, if the image of real object 112 were displayed on display 116. In some examples, an image of real object 112 may not actually be displayed on display 116. The overlap may occur in an overlap region. After registration, processor 154 may identify an overlap part 213, in real image data 212, that corresponds to the overlap region.

Processor 154 may clip overlap part 213 in real object data 212 to produce clipped data 210. Again, for clarity, clipped data 210 is illustrated in FIG. 2 by showing an image of what clipped data 210 would look like if clipped data 210 were rendered on display 116.

In some examples, processor 154 may further execute a perspective warp on clipped data 210, when clipped data 210 and virtual image data 214 have different perspectives along line of sight 110. For example, virtual image 114 may not align perfectly with viewed real object 112 when virtual image 114 is viewed through display 116. Virtual image 114 may keystone or distort along line of sight 110. Vanishing points of the perspectives of viewer 102 and camera 150 may be aligned differently. Processor 154 may execute the perspective warp to account for these types of non-alignment issues.

Processor 154 may, by executing instructions from suppression instructions 180, blur clipped data 210 to produce blurred data 220. Blurred data 220 may correspond to a blurred image of clipped data 210. Blurred data 220, when merged with virtual image data 214 and rendered on display 116, may suppress features of real image 112 from interfering with virtual image 114. Processor 154 may perform the blurring of clipped data 210 with a blurring transform such as a Gaussian blur.

Processor 154, by executing suppression instructions 180, may subtract clipped data 210 from blurred data 220 and produce additive blur component 230. Additive blur component 230 may be data which, when rendered on display 116, may overlay and blur a portion of real object 112. Additive blur component 230 may suppress perception of real object 112 while virtual image 114 may remain in focus.

Processor 154, by executing suppression instructions 180, may add additive blur component 230 to virtual image data 214 to produce merged data 240. Processor 154 may perform the addition by execution of a brightness based merge. A brightness based merge may be related to an amount of brightness of real object 112 and virtual image data 214. Processor 154 may identify and weigh a brightness of virtual image data 214 and then adjust a brightness of additive blur component 230 based on the brightness of virtual image data 214. For example, a brighter additive blur component 230 may be added to darker areas of virtual image 114. A brightness based merge for merged data 240 may also depend on color, temperature, and brightness of a light source of display 116. Processor 154, by executing suppression instructions 180, may send imaging instructions 170 with merged data 240 to display 116.

Figure 3:
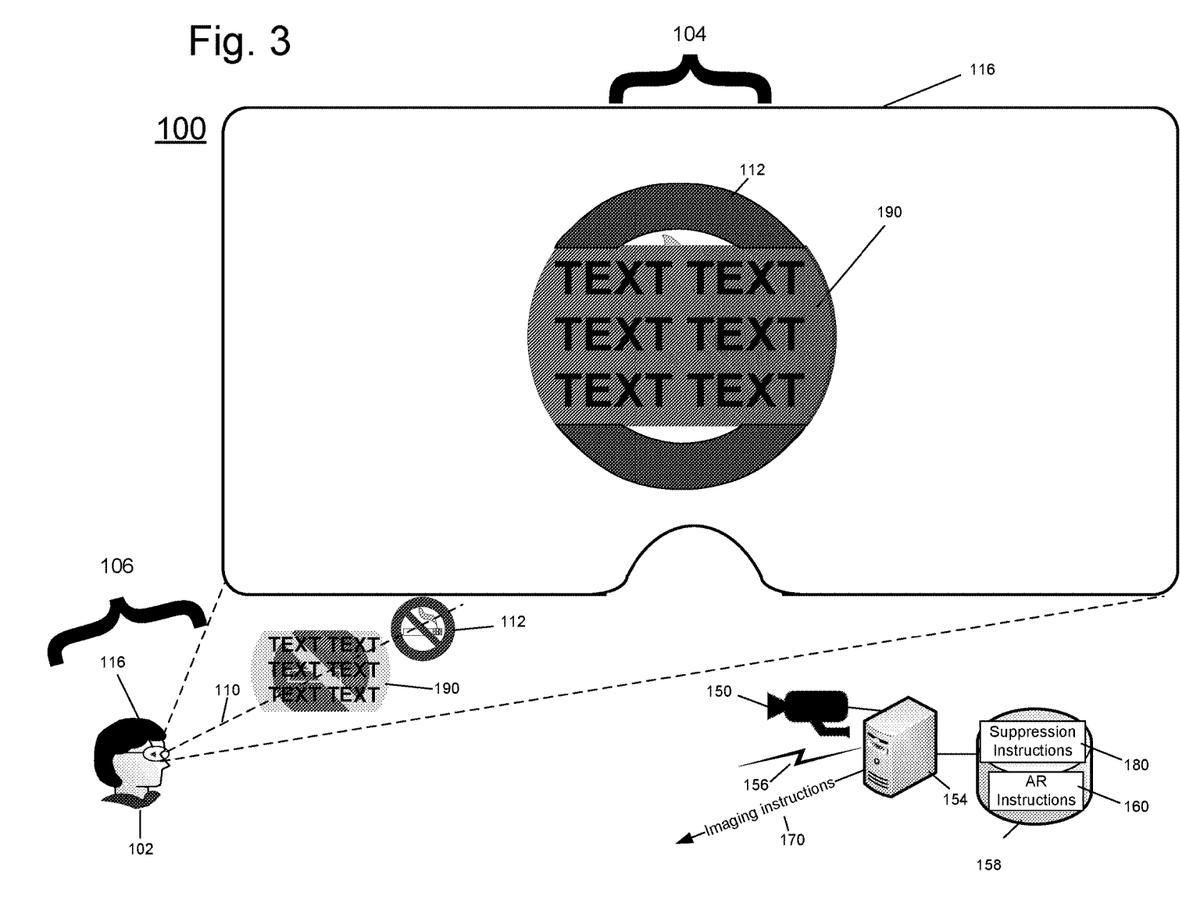
FIG. 3 illustrates the example system of FIG. 1 with further details relating to display of merged data to suppress real features.

FIG. 3 illustrates the example system 100 of FIG. 1 with further details relating to display of merged data to suppress real features, arranged in accordance with at least some embodiments presented herein. Those components in FIG. 3 that are labeled identically to components of FIG. 1 and FIG. 2 will not be described again for the purposes of clarity.

Side perspective 106 depicts viewer 102 wearing an AR glasses device (corresponding to display 116) and viewing merged image 190 displayed on display 116 along line of sight 110. Merged image 190 may be produced when merged data 240 (FIG. 2) is rendered on display 116. Real image 112 may be in the background of merged image 190 along line of sight 110 and may combine with displayed merged image 190 on display 116. Merged image 190 may include additive blur components that may blur features of real object 112.

Front view 104 depicts a composite image, including merged image 190 and real image 112 in the background, viewed by a viewer 102. Real image 112 in the background may visually integrate with merged image 190. Merged image 190 may enable viewer 102 to view a more focused virtual image 114 when merged image 190 is displayed on see-through display 116 over real image 112. The additive blur component in the data corresponding to merged image 190 may suppress details of real image 112 while still displaying a virtual image.

Among other possible benefits, a system in accordance with the present disclosure may provide more focus of a virtual image over a background to a viewer. A viewer may focus more on a virtual image which is in focus than on a real object whose features have been blurred. A blurred real object may be interpreted as less important to a viewer. Details in the virtual image may appear clearer and easier to focus upon to the viewer when contrasted with a blurred background. A system in accordance with the present disclosure may reduce power usage and preserve battery life of a see-through display device. Adding a blurring component to a background real object may require less power than increasing a brightness of a virtual image to create contrast with background real objects.

Figure 4:
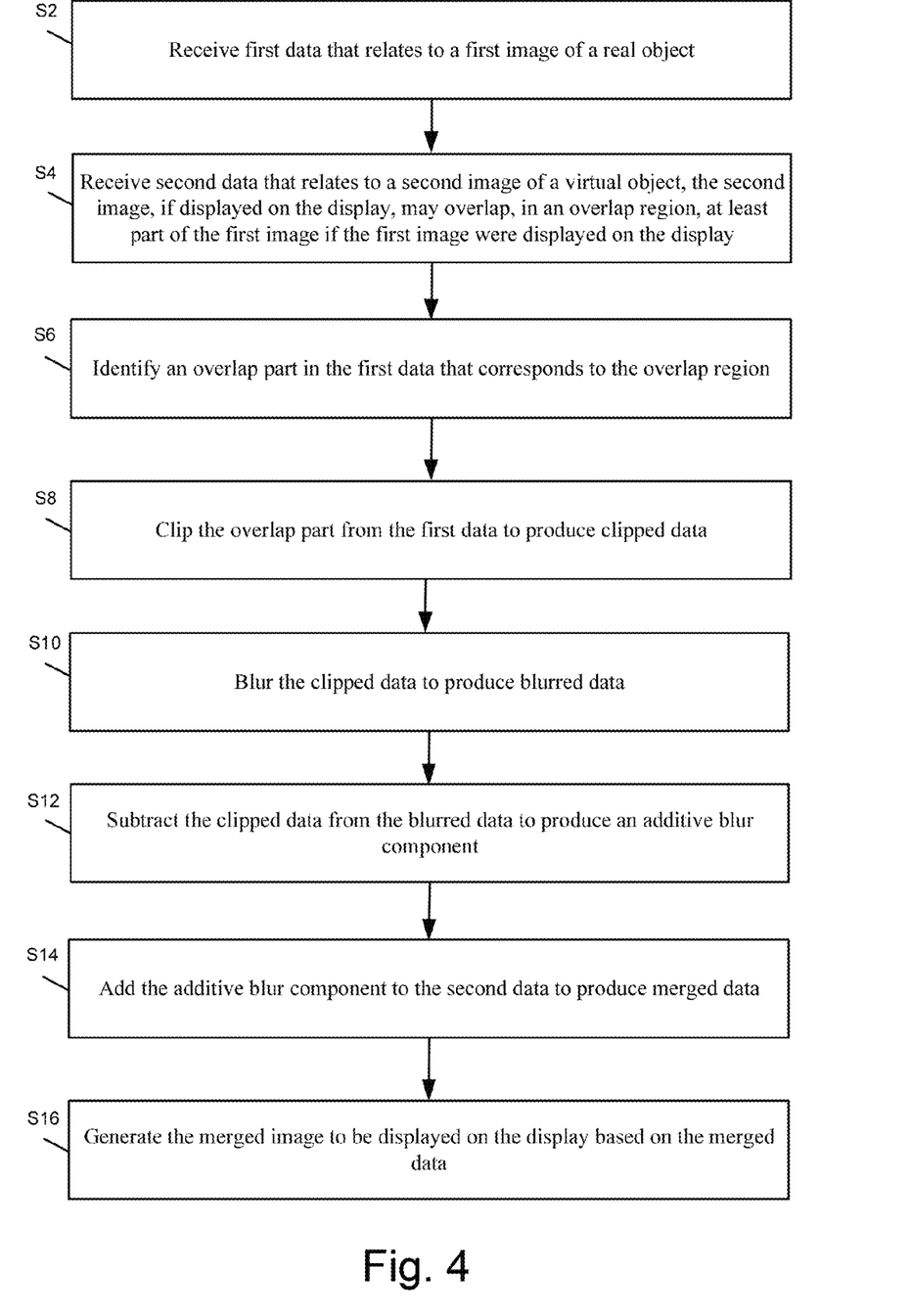
FIG. 4 illustrates a flow diagram of an example process for suppressing real features in a see-through display.

FIG. 4 illustrates a flow diagram of an example process for suppressing real features in a see-through display, arranged in accordance with at least some embodiments presented herein. The process in FIG. 4 could be implemented using, for example, system 100 discussed above and may be used to output a merged image. An example process may include one or more operations, actions, or functions as illustrated by one or more of blocks S2, S4, S6, S8, S10, S12, S14 and/or S16. Although illustrated as discrete blocks, various blocks may be divided into additional blocks, combined into fewer blocks, or eliminated, depending on the desired implementation.

Processing may begin at block S2, "Receive first data that relates to a first image of a real object." At block S2, a processor may receive first data that relates to an image of a real object within the line of sight of a viewer. The first data may be captured by a camera.

Processing may continue from block S2 to block S4, "Receive second data that relates to a second image of a virtual object, the second image, if displayed on the display, may overlap, in an overlap region, at least part of the first image if the first image were displayed on the display." At block S4, the processor may receive second data that relates to a second image. In some examples, the second image, if displayed on the display, may overlap, in an overlap region, at least part of the first image if the first image were displayed on the display.

Processing may continue from block S4 to block S6, "Identify an overlap part in the first data that corresponds to the overlap region." At block S6, the processor may identify an overlap part in the first data that corresponds to the overlap region. In some examples, the processor may determine the part of first data that corresponds to the overlap region where the second data would overlap the first data if both images were displayed on the display.

Processing may continue from block S6 to block S8, "Clip the overlap part from the first data to produce clipped data." At block S8, the processor may clip the overlap part of the first data from the first data to produce clipped data.

Processing may continue from block S8 to block S10, "Blur the clipped data to produce blurred data." At block S10, the processor may perform a blurring function on the clipped data to produce blurred data. In some examples, blurred data may correspond to a blurred image of clipped data. A blurred image of clipped data may suppress features of the image corresponding to clipped data. In some examples, blurring may be performed by a blurring transform such as a Gaussian blur. A blurring transform may smooth out sharp edges and reduce detail in an image.

Processing may continue from block S10 to block S12, "Subtract the clipped data from the blurred data to produce an additive blur component." At block S12, the processor may subtract the clipped data from the blurred data to produce an additive blur component. In some examples, the additive blur component may include the blurred component added to the clipped data by the blurring transform.

Processing may continue from block S12 to block S14, "Add the additive blur component to the second data to produce merged data." At block S14, the processor may add the additive blur component to the second data to produce merged data. In some examples, the processor may perform a brightness based merge when adding the additive blur component to the second data. In some examples, the processor may identify a brightness of second data if displayed on the display and may weigh the amount of added blur to the brightness of the second data if displayed on the display. In some examples, a brighter additive blur component may be added to darker areas of second data if displayed on the display.

Processing may continue from block S14 to block S16, "Generate the merged image to be displayed on the display based on the merged data." At block S16, the processor may generate the merged image to be displayed on the display. The merged image may be based on the merged data. The merged image may, when displayed on the display, display a virtual object while suppressing features of a background real object. A background real object may have its features suppressed by displaying the additive blur component over the background real object.

Figure 5:
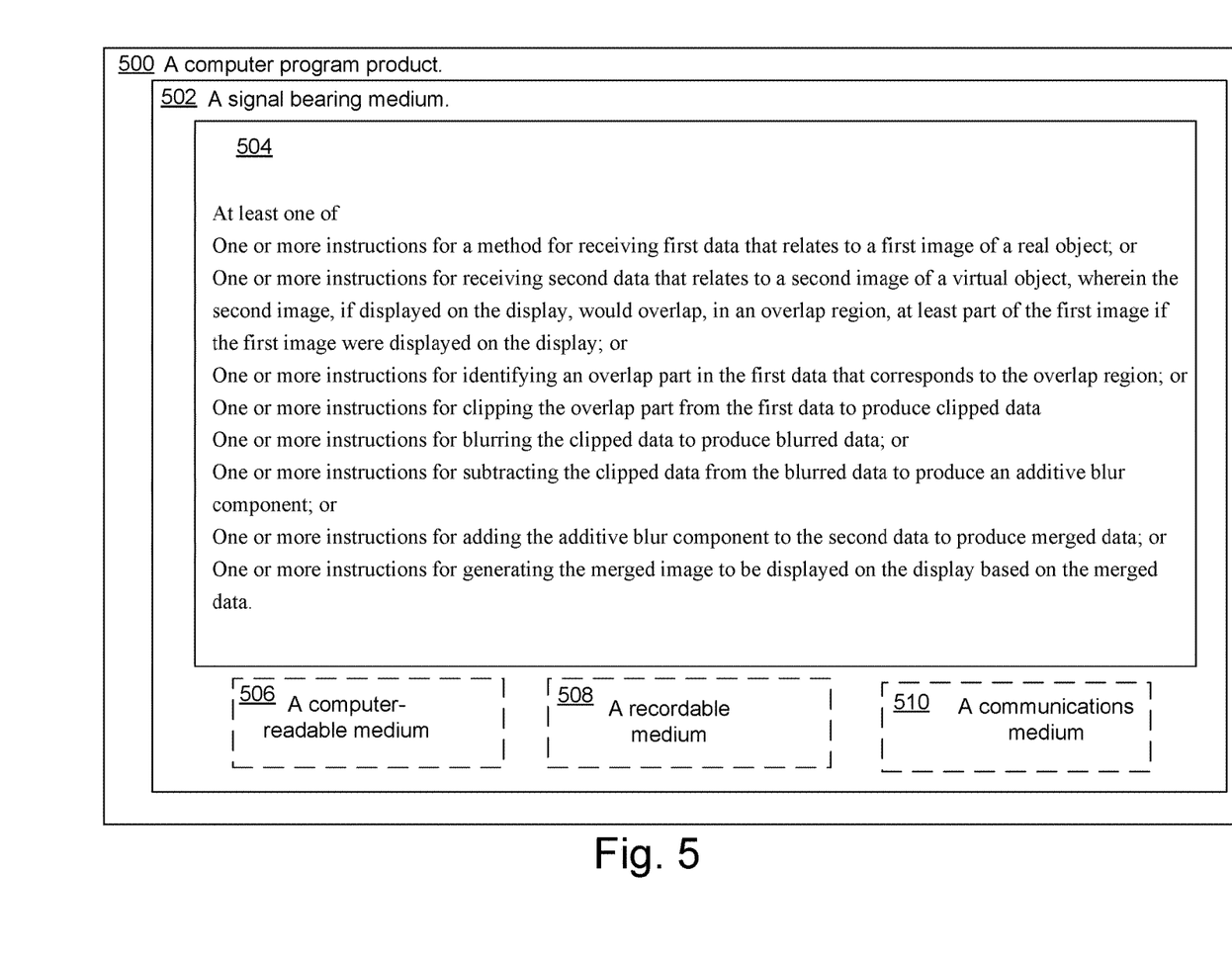
FIG. 5 illustrates a computer program product to implement suppression of real features in a see-through display.

FIG. 5 illustrates a computer program product 500 to implement suppression of real features in a see-through display, arranged in accordance with at least some embodiments presented herein. Program product 500 may include a signal bearing medium 502. Signal bearing medium 502 may include one or more instructions 504 that, when executed by, for example, a processor, may provide the functionality described above with respect to FIGS. 1-4. Thus, for example, referring to system 100, processor 154 may undertake one or more of the blocks shown in FIG. 5 in response to instructions 504 conveyed to system 100 by medium 502.

In some implementations, signal bearing medium 502 may encompass a computer-readable medium 506, such as, but not limited to, a hard disk drive, a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, program product 500 may be conveyed to one or more modules of the systems 100 or 200 by an RF signal bearing medium 502, where the signal bearing medium 502 is conveyed by a wireless communications medium 510 (e.g., a wireless communications medium conforming with the IEEE 802.11 standard).

Figure 6:
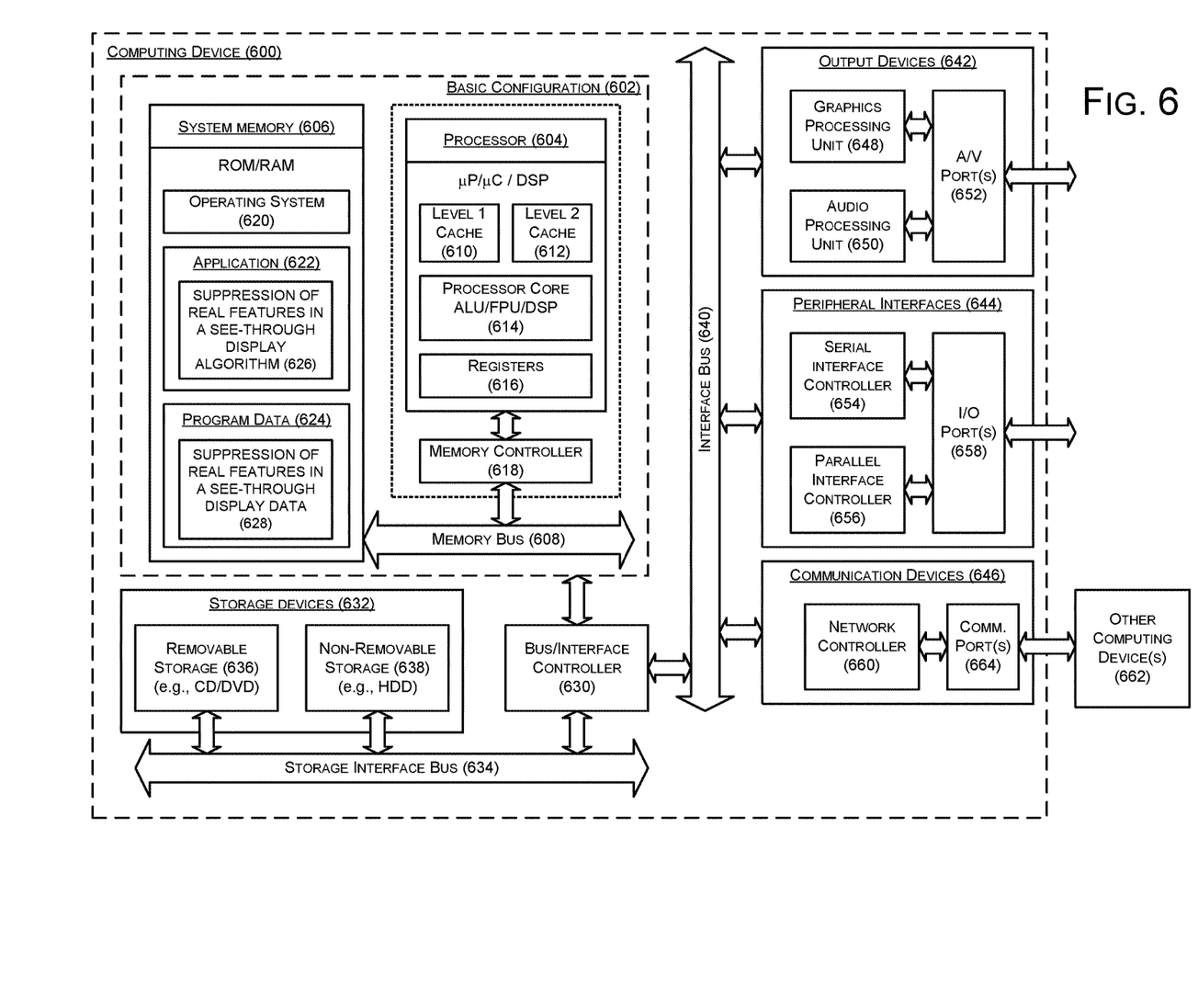
FIG. 6 is a block diagram illustrating an example computing device that is arranged to implement suppression of real features in a see-through display; all arranged in accordance with at least some embodiments presented herein.

FIG. 6 is a block diagram illustrating an example computing device 600 that is arranged to implement suppression of real features in a see-through display, arranged in accordance with at least some embodiments presented herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624.

Application 622 may include a suppression of real features in a see-through display algorithm 626 that is arranged to perform the functions as described herein including those described previously with respect to FIGS. 1-5. Program data 624 may include a suppression of real features in a see-through display data 628 that may be useful for suppression of real features in a see-through display as is described herein. In some embodiments, application 622 may be arranged to operate with program data 624 on operating system 620 such that suppression of real features in a see-through display may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CDs) drives or digital versatile disk (DVDs) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to display a merged image on a display, the method comprising, by a processor:
   receiving first data that relates to a first image of a real object;
   receiving second data that relates to a second image of a virtual object, wherein the second image, if displayed on the display, would overlap, in an overlap region, at least part of the first image if the first image were displayed on the display, and wherein the virtual object includes text;
   identifying an overlap part in the first data that corresponds to the overlap region;
   clipping the overlap part from the first data that relates to the first image of the real object by copying the overlap part to produce clipped data, wherein the clipped data includes data that corresponds to the first image of the real object in the overlap part;
   blurring the clipped data by application of a blurring transform on the clipped data, where the clipped data includes data that corresponds to the first image of the real object in the overlap part, to produce blurred data related to the first image of the real object;
   subtracting the clipped data related to the first image of the real object from the blurred data related to the first image of the real object to produce an additive blur component;
   adding the additive blur component to the second data related to the second image of the virtual object to produce merged data, wherein adding the additive blur component includes executing a brightness based merge, and wherein executing the brightness based merge includes:
      identifying a first brightness of the second data; and
      adjusting a second brightness of the additive blur component based on the first brightness;
   generating the merged image to be displayed on the display based on the merged data; and
   outputting the merged image on the display so that the merged data appears in the overlap region.

2. The method of claim 1, wherein the display includes a see-through display.

3. The method of claim 1, further comprising: prior to identifying the overlap part, registering a first location of the first data with a second location in the second data.

4. The method of claim 3, wherein registering includes aligning four corner locations of the first data with four locations in the second data.

5. The method of claim 3, wherein registering includes aligning the first location of the first data to a feature of the real object represented in the second data.

6. The method of claim 1, further comprising: prior to blurring the clipped data, executing a perspective warp to the clipped data when the clipped data and the second data have different perspectives along the line of sight.

7. The method of claim 1, wherein the blurring transform includes a Gaussian blur.

8. The method of claim 1, wherein blurring the clipped data includes executing a computer vision function on the clipped data to produce the blurred data.

9. An augmented reality device effective to display an image, the device comprising:
   a memory that includes instructions;
   a camera configured to capture first data that relates to a first image of a real object;
   a processor configured to be in communication with the memory and camera, the processor configured to:
      receive the first data;
      receive second data that relates to a second image of a virtual object, wherein the second image, if displayed on the display, would overlap, in an overlap region, at least part of the first image of the real object if the first image of the real object were displayed on the display, and wherein the virtual object includes text;
      identify an overlap part in the first data that corresponds to the overlap region; clip the overlap part from the first data that relates to the first image of the real object by generation of a copy of the overlap part to produce clipped data, wherein the clipped data includes data that corresponds to the first image of the real object in the overlap part;
      blur the clipped data by application of a blurring transform on the clipped data, where the clipped data includes data that corresponds to the first image of the real object in the overlap part, to produce blurred data related to the first image of the real object;
      subtract the clipped data related to the first image of the real object from the blurred data related to the first image of the real object to produce an additive blur component;
      add the additive blur component to the second data related to the second image of the virtual object to produce merged data, wherein the addition of the additive blur component includes execution of a brightness based merge, and wherein execution of the brightness based merge includes:
         identification of a first brightness of the second data; and
         adjustment of a second brightness of the additive blur component based on the first brightness; and
      generate a merged image; and
   a display configured to be in communication with the processor, the display configured to display the merged image on the display so that the merged data appears in the overlap region.

10. The device of claim 9, wherein the display includes a see-through display.

11. The device of claim 9, wherein the processor is further configured to register, prior to identification of the overlap part, a first location of the first data with a second location in the second data.

12. The device of claim 9, wherein the processor is further configured to execute a perspective warp to the clipped data when the clipped data and the second data have different perspectives along the line of sight.

13. The device of claim 9, wherein the blurring transform includes a Gaussian blur.

14. A method to display a merged image on a display, the method comprising:
    capturing first data through a camera, wherein the first data relates to a first image of a real object;
    receiving, by a processor, second data that relates to a second image of a virtual object, wherein the second image, if displayed on the display, would overlap, in an overlap region, at least part of the first image if the first image were displayed on the display, and wherein the virtual object includes text;
    identifying, by the processor, an overlap part in the first data that corresponds to the overlap region;
    clipping, by the processor, the overlap part from the first data that relates to the first image of the real object by copying the overlap part to produce clipped data, wherein the clipped data includes data that corresponds to the first image of the real object in the overlap part;
    blurring, by the processor, the clipped data by application of a blurring transform on the clipped data, where the clipped data includes data that corresponds to the first image of the real object in the overlap part, to produce blurred data related to the first image of the real object;
    subtracting, by the processor, the clipped data related to the first image of the real object from the blurred data related to the first image of the real object to produce an additive blur component;
    adding, by the processor, the additive blur component to the second data related to the second image of the virtual object to produce merged data, wherein adding the additive blur component includes executing a brightness based merge, and wherein executing the brightness based merge includes:
        identifying a first brightness of the second data; and
        adjusting a second brightness of the additive blur component based on the first brightness;
    generating, by the processor, the merged image based on the merged data; and
    displaying the merged image on the display so that the merged data appears in the overlap region.

15. The method of claim 14, further comprising, by the processor:
    registering a first location of the first data with a second location in the second data; and
    executing a perspective warp to the clipped data when the clipped data and the second data have different perspectives along the line of sight, wherein:
    applying the blurring transform on the clipped data includes applying a Gaussian blur; and
    adding the additive blur component includes executing a brightness based merge to add the additive blur component to the second data.

* * * * *

UNITED STATES PATENT AND TRADEMARK OFFICE
CERTIFICATE OF CORRECTION

PATENT NO. : 9,607,409 B2
APPLICATION NO. : 14/373829
DATED : March 28, 2017
INVENTOR(S) : Kruglick Page 1 of 1

It is certified that error appears in the above-identified patent and that said Letters Patent is hereby corrected as shown below:

In the Specification

In Column 1, Line 8, delete "§371" and insert -- § 371 --, therefor.

In Column 2, Line 65, delete "hereof In" and insert -- hereof. In --, therefor.

Signed and Sealed this
First Day of August, 2017

Joseph Matal
*Performing the Functions and Duties of the
Under Secretary of Commerce for Intellectual Property and
Director of the United States Patent and Trademark Office*